United States Patent [19]

Marinucci

[11] 4,275,491
[45] Jun. 30, 1981

[54] MULTI-COMPLEX SHEAR DEVICE FOR SPLITTING HOT METALLIC BARS INTO SEVERAL SMALLER BARS

[76] Inventor: Roberto Marinucci, Via Lucia Silla, 59 Napoli, Italy

[21] Appl. No.: 98,827

[22] Filed: Nov. 30, 1979

Related U.S. Application Data

[63] Continuation-in-part of Ser. No. 873,385, Feb. 8, 1977, abandoned.

[51] Int. Cl.³ .................. B21B 15/00; B21B 1/00; B26D 11/00
[52] U.S. Cl. .................................. 29/33 R; 72/204; 83/864
[58] Field of Search .................. 29/33 S, 33 R, 33 C, 29/566, 566.1, 56 R; 83/863, 500, 501, 502, 503, 864; 72/203, 204; 225/2, 96

[56] References Cited

U.S. PATENT DOCUMENTS

| 281,184 | 7/1883 | Greer | 72/204 |
| 3,641,853 | 2/1972 | Jungbeck | 83/864 |

*Primary Examiner*—Harrison L. Hinson
*Attorney, Agent, or Firm*—McAulay, Fields, Fisher, Goldstein & Nissen

[57] ABSTRACT

A shear device for splitting hot metallic bars or billets into smaller forms on a continuous basis, as the metallic bars continuously exit from a mill. The shear device comprises two mechanical complexes. The first mechanical complex is a circular shear for generating shearing stresses in the metallic bar by displacing portions of the metallic bar with respect to adjacent portions thereof, and the second mechanical complex wedges and shapes the deformed metallic bar into separate bars.

8 Claims, 23 Drawing Figures

II  III  IV

V  VI  VII

VIII  IX  X

MULTI-COMPLEX SHEAR DEVICE FOR SPLITTING HOT METALLIC BARS INTO SEVERAL SMALLER BARS

CROSS-REFERENCE TO RELATED APPLICATION

This is a Continuation-in-Part of U.S. Patent Application Ser. No. 873,385, Feb. 8, 1977, by the inventor hereof (now abandoned).

BACKGROUND OF THE INVENTION

The present invention concerns a multiple complex shear ddevice which operates in two stages to split metallic bars or billets which are continuously extruded from a casting mill, into smaller bars or billets of rectangular or square cross section.

More particularly, the present invention is concerned with a dual mechanical complex shear. The first shearing complex is in the form of a circular shear, which partially cuts (about 2/3) a hot metallic bar and partially displaces it along the cutting line to generate shearing stresses in the hot metallic bar as it exits from the extrusion or casting mill of a steel plant. The second shearing complex both wedges and shapes the displaced portions of the metallic bar into separate and properly formed smaller bars along the shearing stresses.

The present invention is intended to provide a means by which a single casting mill specializing in forming larger bars, can be used to provide differently and variously sized smaller steel bars, as required. This feature provides for a tremendous savings in capital investments, as well as in running and operating costs, over the various prior methods and aparatuses for obtaining different sized bars.

One prior method requires the use of a different mill for each differently sized form required. Unless one can find a customer for the continuous output of such a mill, this solution requires equipment which is not fully utilized. Unless plants are run at optimum levels, they cannot be most efficiently used because a ready market for full product output of any particular size casting does not always exist.

At present, mechanized means are not believed to exist for the efficient longitudinal shearing of larger bars into smaller bars, and which mechanized means can be used in series continuously with the output of an extrusion or casting mill. Occasionally, a longitudinal shear has been used to split larger bars into smaller bars, but this has not been accomplished in line with the casting or extrusion mill. In addition, this has only been done in a limited way due to excessive swarf information and the very high cost involved in shearing and trimming the bars.

As noted above, steel plants presently produce metallic bars using a continuous casting method and are generally divided into plants producing large, normal, and small cross-sectioned products, as required by the customers of the extrusions. Each of these plants must necessarily have a number of lines to produce castings or extrusions as required. As can readily be realized, by using a shear device to split a single casting or extrusion into a number of smaller sizes, as required, a number of economies can be realized. In addition, plants presently specializing in large bars can now produce smaller rectangular sections such as blooms or billets or semi-finished products. In general, this means that one can produce a single large casting having one dimension which is of the desired size and another dimension which is a multiple of the second desired dimension. The single casting can then be sheared and shaped into a multiple of smaller castings of the desired size.

The present invention also has utility for use in blooming plants or mills wherein ingots of metal, for example ingots produced at other steel plants, are rolled into finished form. At present, it is necessary to roll the ingot successively until the desired shape is formed. Such mills can be very complicated and are very expensive to build and to operate. Often, the results are inadequate or obtained only with low efficiency and, therefore excessive cost. The shearing stress produced by blooming mills is limited and often results in an increase in the amount of swarf (or waste trimmings) that result. Sometimes, it is necessary to reheat the bars back to the temperature at which they were originally rolled using furnaces which are expensive to build and to operate. Using a shear device according to the present invention, and locating it in the rolling mill line, it will again only be necessary to roll the ingot to produce a section of a thickness equal to the height of the section to be formed and a width equal to the sum of the widths of all the bars to be formed by use of the shearing device according to the present invention. The rolled ingot can then be sheared into the appropriately sized bars.

Consequently, the introduction of a shear device, according to the present invention, into plants for the production of steel bars, either by continuous casting or extrusion, or by the rolling of ingots or the like, can be used to avoid many of the disadvantages of the prior methods, while reducing production costs and increasing the flexibility of a particular processing line.

It is therefor an object of the present invention to provide a shear dévice which continuously shears a hot metal bar in a longitudinal direction of the hot metal bar to form therefrom smaller metal bars having a square or rectangular cross-section.

It is a further object of the invention to provide a shear device which operates continuously on a continuously cast or extruded steel bar as it comes from the steel mill or out of a blooming mill.

Another object of the invention is to provide a shear device which operates in two stages to produce a plurality of metallic bars from a single larger bar, in which the smaller bars are trimmed and have been produced with a minimum of swarf or waste.

BRIEF DESCRIPTION OF THE INVENTION

Briefly, the present invention is concerned with a shearing device provided with two shearing complexes operating in a complementary manner in order to shear or split a larger metallic bar longitudinally into smaller rectangularly cross-sectioned metallic bars.

The first complex comprises coacting shearing rollers which rotate in opposite directions to drive the large bar therebetween and in a horizontal transport plane. Passage of the large bar through the first complex displaces it into a number of segments and partially cuts (about ⅔ of) the thickness of the bar. The deformation or creeping of the bar along the cutting lines generates stress cracking. The second complex severs or wedges the displaced segments from one another and trims them to the desired (rectangular, for example) shape. Both complexes are anchored to a strong frame to permit their relative positioning as required for the operation of the combination, to be described hereinafter.

The first of these complexes comprises two shearing rollers, mechanized and motorized, having splines or grooves. The width of the grooves are equal to the width of the smaller sectioned bars that are to be produced by means of the shearing stress, and the depth of the grooves are less than the height of the bars. These shearing rolls are superposed in such a way that each spline or groove corresponds, in a geometric fitting, to a part without splines in the other roller. The sum of the splines or grooves of the upper and lower roller is equal to the number of the bars which will be obtained by the shear stress process. The shearing rollers may be formed of a single piece, or may be assembled out of several pieces secured together to obtain the desired profile as discussed above.

The rollers are horizontally disposed and driven in a counter-rotary manner to drive large bars therethrough. They are spaced apart a distance equal to about ⅓ the thickness of the bar to be cut, and are symmetrically disposed about a central horizontal plane which defines the pass-line for the bar being sheared, and coincides with the bar's horizontal center plane.

A bar passing between two shearing rollers will be partially cut and partially deformed into several displaced portions by the alternating groove position on the adjacent rollers, about the horizontal pass-line plane.

The second complex comprises, depending on the number of bars to be cut, one or more lower tools and one or more upper tools, each having a predetermined shape according to their function and corresponding to the dimension of the section of the bars on which the tools are to operate. The various tools which form the second complex operate, according to their shape and relative position, as a guide, an expansion means, a support, a lateral push or wedge device, and; with additional tool portions, as a trimmer to scrape and to chamfer the bar as required. These tools split the bar along creep lines formed by the first complex, wherein stress-cracking was induced.

Other objects, advantages and the nature of the invention will become readily apparent from the detailed description of the invention taken in connection with the drawings.

BRIEF DESCRIPTION OF THE DRAWINGS

In the Drawings:

FIGS. 10A and 10B show side and perpsective views of a tool of the second mechanical complex;

FIGS. 11A, 11B and 11C diagrammatically show a run-out table and associated devices; and, FIGS. 12-19, each shows: above, first mechanical complex shearing cylinder arrangements; below, second mechanical complex tools arrangements; for two to nine bars to be cut from a single bar.

DESCRIPTION OF THE PREFERRED EMBODIMENT

Accordingly to the fundamental concept of the present invention, the process of longitudinally splitting a bar or billet into smaller bars takes place as a result of partial (approximately ⅔) cutting of and generation of, a shearing stress in, a bar or billet or at a section or sections thereof. The shearing complex 2 (FIGS. 1 and 9) of the present invention applies forces in two separate stages (shearing moments) by utilizing two seperate mechanical or shearing assemblies. Each mechanical assembly 2A, 2B has a distinct, although complementary, function with respect to the other, so that the complete shearing of the single bar into smaller bars does not occur until after the bar has been operated on by both assemblies 2A, 2B. The assemblies 2A, 2B are preferably bolted, hooked with or otherwise anchored to a support assembly as is appropriate and as is usual in the art. The first assembly accomplishes an approximately (⅔) cut and a creeping deformation of the bar to form stress cracks while the second assembly pushes or wedges the deformed portions apart—thereby completing the cutting action.

Figure 1:
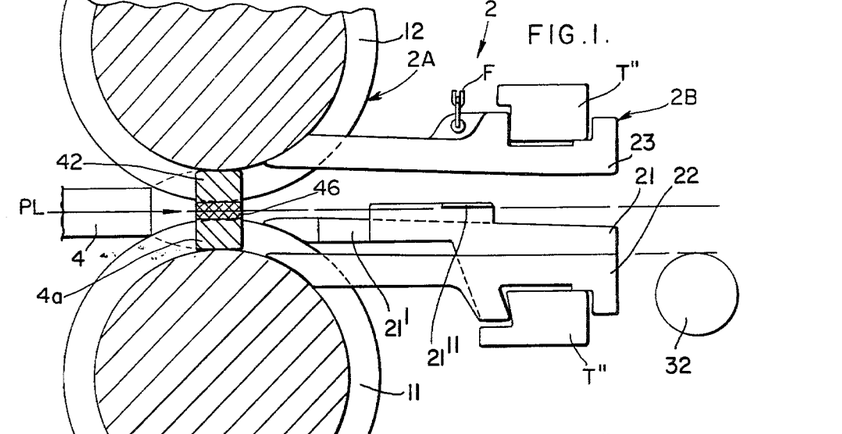
FIG. 1 is a lateral view of the shear device of the present invention, with shearing rollers and complementary tools.

FIG. 1 illustrates the essential parts of the two coacting mechanical complexes disposed about the horizontal passline (PL) or shearing plane (HP FIG. 2) and with regard to the direction of movement of the bar 4 to be cut along the horizontal plane (HP).

Figure 7:
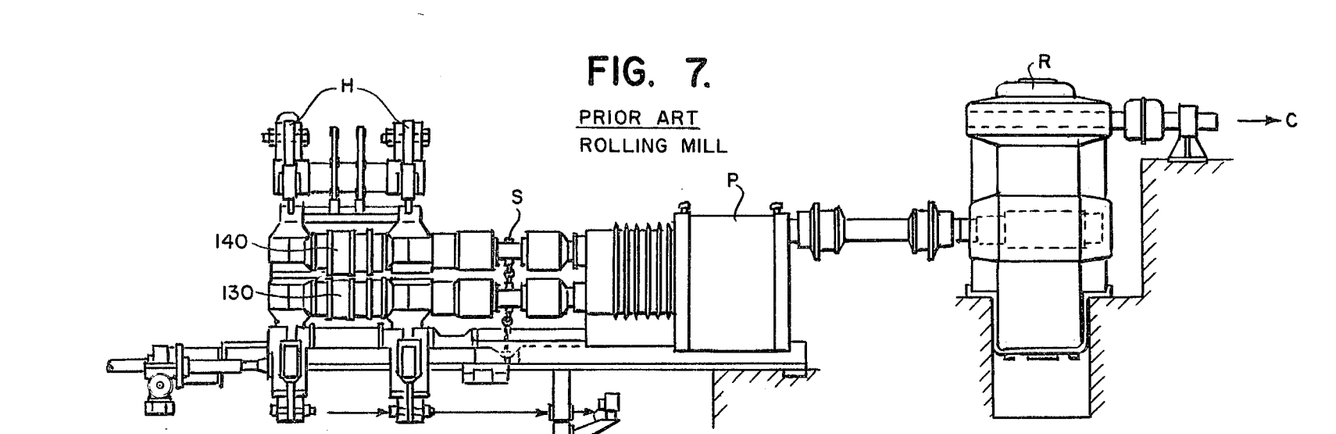
FIG. 7 shows a prior art rolling mill which can be generally modified for use with the shearing rollers of the present invention.

The first one of these two shearing assemblies or mechanical complexes 2A has two cylinders 11 and 12 (FIG. 1 and FIG. 9) provided with grooves 11' and 12' (FIG. 5 and FIG. 9) which will be described in detail hereinbelow. The two cylinders 11, 12 are preferably supported as is usual for supporting rolling cylinders in blooming or rolling mills. Usual rolling cylinder arrangements are shown, for example, schematically in FIG. 7 wherein the generally prior art support and driving structure is shown and wherein:

H—shows the horizontal rolls stand;
130,140—shown the top and bottom work rollers;
P—shows the pinion stand;
S—shows the spindles and coupling;
R—shows the reduction gear; and
C—shows the connection to the main gear drive.

In the first mechanical assembly 2A, according to the present invention, the various elements may be disposed as is generally usually to dispose working rollers in the art, and as illustrated in FIG. 7. The main difference is that instead of rolling cylinders 130 and 140, shearing cylinders 11 and 12 are provided with grooves 11' and 12' for partially cutting and deforming the first bar 4.

The shearing cylinders 11, 12 of the present invention device, are preferably placed and supported in a roll stand structure of the kind normally employed in usual roll mill assemblies (FIG. 7). Cylinders 11, 12 are connected to a motor and transmission for counter-rotation, and adjusted by means of mechanical structures well-known and normally employed in usual rolling mill devices (FIG. 7). The cylinders 11, 12 are of about equal diameter and are symmetrically disposed about a plane through which is defined the Pass-Line (PL-FIG. 1) for the bar 4. The cylinders are spaced apart about ⅓ the thickness of the bar thereby to accomplish about a ⅔ cutting of the bar 4 as it passes therebetween.

The second mechanical assembly 2B according to the preferred embodiment of the present invention consists in an assembly of three fundamental tool arrays. The total number of tools being determined by the number of cuts to be made in the bar. These tools are placed and shaped as will be described in detail hereinbelow, to complete the separation of the pre-deformed bar-sections, which have been so deformed by passages through the rollers 11, 12. The tools, shown as elements 21, 22 and 23, are hooked or anchored, in the usual manner as are trimming tools, to the same roll stand as the first assembly (FIG. 7). In general, tools 22 and 23 are disposed with their anterior parts near rollers 11, 12 respectively.

The shearing rolls 11, 12 according to the present invention have splines or circumferential grooves 11', 12', with an appropriately predetermined profile of their section which determines the shape of the bars to be sheared from the larger bar. The rolls 11, 12 are formed of usual materials for rolling steel or other metals, and must be sufficiently strong for rolling or stressing the bars. The rolls also require cooling as is usual in the art, to remove excess heat absorbed during the contact with the hot bars to be deformed. The relative position of the rollers 11, 12, can be adjusted, again by well-known means to adjust forming rollers in this art, and therefore to fix the pass-line (arrow PL, FIGS. 1, 11A, 11B, 11C) with respect to the horizontal plane defined half-way between the rollers 11, 12 (HP in FIG. 2) and adjust the spacing between the rollers 11, 12 to correspond to about ⅓ the thickness of the bar 4 to be cut. It is preferable, in using the present invention, to align the pass-line PL or horizontal plane HP to be coincident with the pass-line of the feeding rollers 31 (FIGS. 11A, 11B, 11C) and the outlet rollers 32.

As was noted above, the rollers 11, 12 rotate in opposite directions (FIG. 9) with respect to each other as the first bar 4 passes therebetween to be deformed, thereby simultaneously to propel or drive the first bar 4 along the line (Arrow PL, FIGS. 11A, 11B, 11C) and to cut and shear the bar 4. With reference to FIG. 1, portions 4a of bar 4 have been cut while portion 4b (between the rollers 11, 12) remains uncut.

Shearing rollers 11 and 12 are provided with a "neck", or hub N (FIG. 8) forming the shaft carried by bearings in the support structure, as is usual in the art. The shearing rollers are driven by usual means as shown diagrammatically in FIG. 7.

Figures 5, 6:
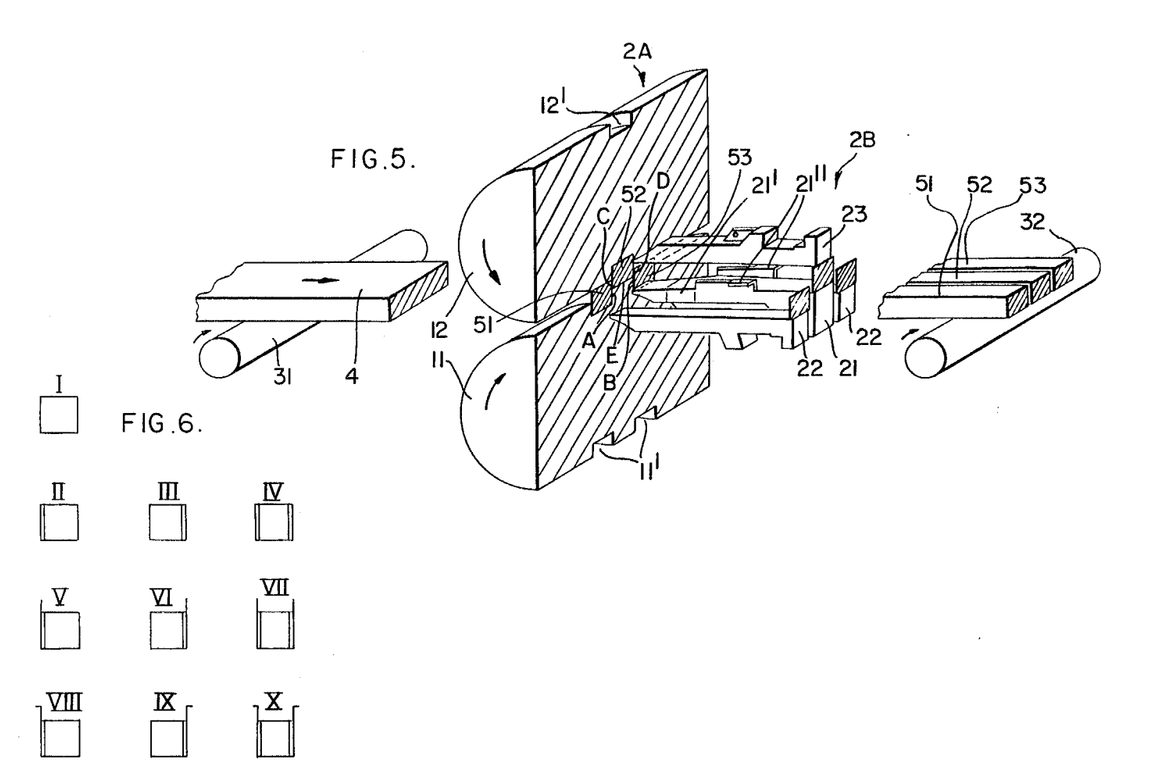
FIG. 5 is an axonometric view of the shear device showing the shearing action on a bar as it passes through the present invention shear.
FIG. 6 are schematic sectional views of various tools which may be employed in the upper and lower positions for the second mechanical complex of the present invention.
Figure 9:
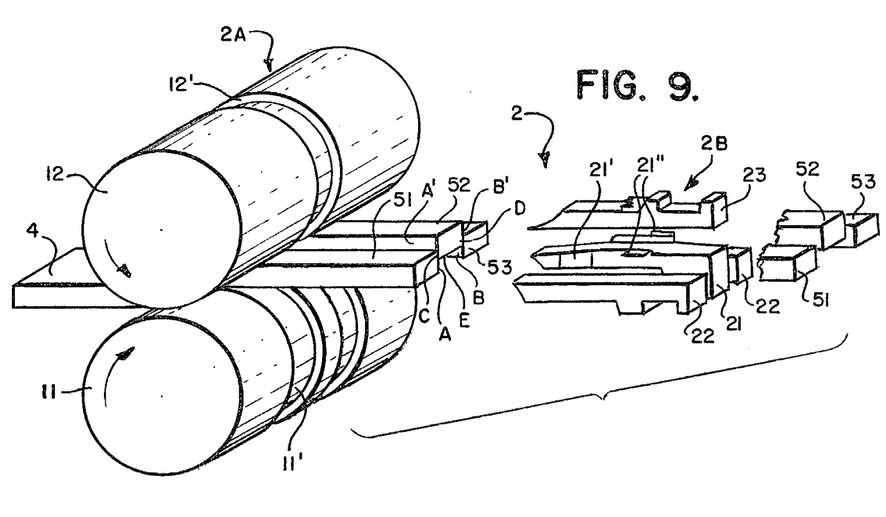
FIG. 9 is an axonometric view similar to FIG. 5 but with the shearing complex separated and the sheared bar shown in detail as it passes through each stage.

The second mechanical complex 2B is also anchored to the support structure so that the tools 21, 22, 23 which define the second mechanical complex may be anchored with their anterior parts in alignment with grooved portions of the rollers 11, 12, and consequently in alignment with the deformed portions 51, 52, 53 of bar 4 (FIGS. 1, 5, 9). The second mechanical complex includes one or more lower tools 21, 22 and one or more upper tools 23, as required by the number of second bars or sections 51, 52, 53 to be cut from the rod 4. These tools 21, 22, 23 operate as a guide, support, a lateral pushing device or wedge, an expansion device or wedge, and if required, as a trimmer to scrape and chamfer the severed second bars 51, 52, 53. It is preferable that the tools in the second mechanical complex be easily removable as required, from the support frame, for replacement when they become worn or when it is necessary to add, or remove some of the tools depending on the number of sections to be cut from first bar 4. They can be hooked and bolted to the support frame as convenient—in accordance with usual practice in the art.

In the position of the preferred embodiment as shown in FIG. 1, lower tools of the type designated by reference numeral 22 lean with their anterior left portion, each of which is on an arc of the two grooves of the shearing roll 11 and with the posterior right portion on a lower cross-bar T' parallel to the axis of the rolls 11-12 having the form or shape of a boot. On this bar, the posterior right portion of the lower tool 21 also leans and the anterior left portion leans on a portion of arc of the shearing roll 11 without grooves but it is included, in this example, between the two grooves. The upper tool 23 leans with its anterior left portion on an arc of the groove of the shearing roll 12. With its posterior right portion the upper tool 23 leans on an upper cross-bar T", parallel to the axis of the rolls 11-12, and it has the form of an inverted boot, while in its center, it is connected with a tie rod chain which, in addition to keeping it suspended, forces it to the two extremities as above-mentioned. The run-out table is designated 32, FIG. 1 and shows the essential portion of a shearing complex apparatus in accordance with the present invention. For clarity, and as it is already well known in the art, the lateral particulars of shearing rolls and all the other particulars relative to the carrying structures either of the shearing rolls 11, 12 or of the tools 21, 22 23 have been deleted. For example, a horizontal stand of a billets mill (FIG. 7) can be employed for everything with respect to the mechanical structure, but not for the operating function.

The second mechanical assembly 2B tools operate to complete the detachment of second bars or sections 51, 52, 53 from each other. The second assembly also operates to guide, support and otherwise operate on the individual second bars as they are moved toward the run-out 32 (FIGS. 11A, 11B, 11C) by means of frictional engagement with the rotating shearing rolls 11, 12. The tools 21, 22 are placed, preferably as shown in FIGS. 1 and 2, with their forward ends resting on shearing rollers 11, 12 and with their rearward ends hooked or otherwise secured to the frame.

The shear 2 as illustrated in FIG. 9 has first mechanical complex 2A and second mechanical complex 2B which are separated in order to help visualize the relative positioning and complementary operation of the first 2A and second 2B mechanical complexes. As noted, the forward end of each of the tools of second complex 2B is aligned with an edge of a deformed section of the first bar 4 while the remainder of each tool is inclined to generate a further shearing or a wedging force to split the portions into seperate rods as is diagrammatically shown in FIG. 9.

Figure 2:
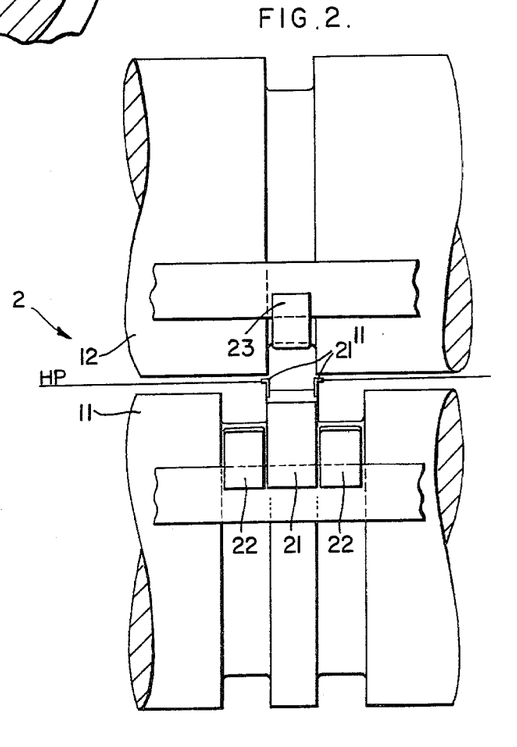
FIG. 2 is a rear elevational view of the shear device of FIG. 1.
Figure 3:
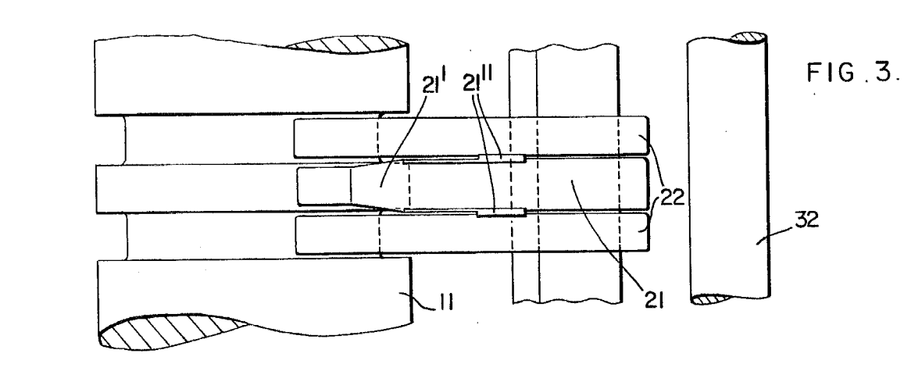
FIG. 3 is a plan view of a portion of the shear device according to FIG. 1.

FIGS. 2 and 3 are provided for the purpose of better clarifying what is illustrated in FIG. 1. Particularly, with reference to the tools of the second mechanical complex, it is noted that they are represented on a smaller scale, and therefore their particular form corresponds exactly to an actual example of the description of the invention. Still, with reference to the tools as best seen in FIGS. 6 and 9, it is noted that stripper guide and support functions are entrusted to all the kinds of them; the tool 21 also has at 21′, the functions to force and to push; and, at 21″, the functions to scrape and to chamfer.

Figure 4:
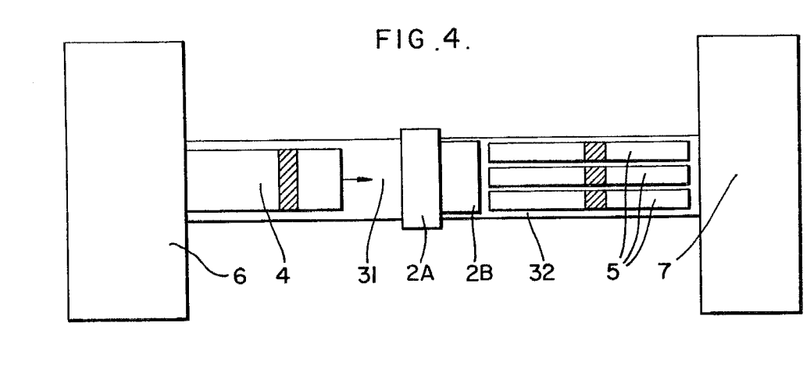
FIG. 4 is a schematic top view of the various stages along a working line in which the present invention shear device is inserted.

As schematically shown in FIG. 4 the production plant 6 for large bars is shown as having rectangular or square sections, such as for example, continuous casting plants, blooming mills or intermediate mills plants or the heating area of the bar to be longitudinally cut. As described above in order for large bar 4 to be longitudinally cut, it is transported and travels towards the shear complex or apparatus. The run-in table on which the bar is transported towards the shearing complex is diagrammatically shown at 31 as a roller 2A, 2B. The two coating mechanical complexes which are the subject matter of this application are diagrammatically illustrated. At the other end, run-out table 32 is also diagrammatically shown as a roller on which the bars 51, 52, 53 are transported after they are produced by the longitudinal shearing of the large bar 4. Then the transversal shearing devices which are known in the art for cutting the bars 51, 52, 53 into suitable lengths are provided and the cooling bed for the cut bars is then provided.

In FIG. 5, the bar which is longitudinally cut is designated by reference numeral 4, and the cross-section which is produced is shown with the appropriate dashed hatching lines. The previously mentioned run-in table 31 moves the bar into the shearing apparatus from which it is delivered onto run-out table 32. The two shearing rollers 11, 12 of the first mechanical complex 2A are sectioned on the vertical plane passing along the respective axis; two grooves are shown in the shearing rolls, groove 11′ in the lower roll and the groove 12′ in the upper roll. These grooves 11′ and 12′ form, in correspondence with the vertical plane as regards to intermediate horizontal shearing plane (HP), the three geometric rectangular displaced portions 51, 52 and 53 which illustrate the cross-section of the bar 4 after the first step provided for by the process and performed by the first mechanical complex in accordance with the present invention.

FIG. 5 also illustrates the second mechanical complex 2B positioned in the same manner as in FIGS. 1, 2 and 3; wherein the three rectangular displaced portions 51, 52, 53 are separated into individual bars 51, 52, 53 as they exit from the tools 21, 22 and 23, on the vertical plane passing across the output end of second complex 2B.

Thus, the three portions of bars 51, 52 and 53 which pass longitudinally the portion of the tools of the coacting complex (essentially that of the tool 21), are forced through A and B by the anterior portion 21′, and are separated by the portions C and D which have an entity spaced between the portions C and D equal to the thickness of the anterior vertical blades of 21′ so as to form the separate bars 51, 52 53.

In the extreme right part of FIG. 5, the cross-sections of the three portions of separate bars as represented by conventional section cross hatching are placed onto the transport plane of run-out table 32, and thereafter the bars are transported a usually short distance to the transversal shearing and to the cooling station 7.

Figure 8:
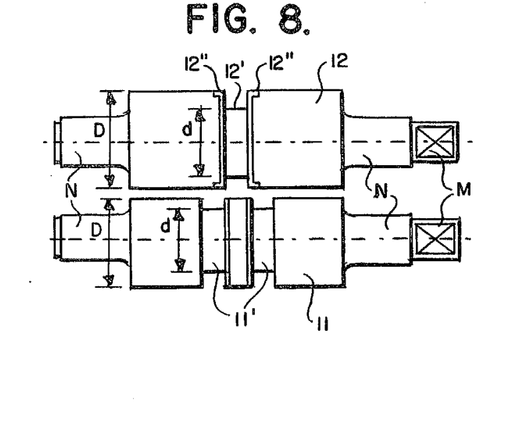
FIG. 8 is similar to FIG. 2 but without the second shearing complex in place.

Thus, because grooves 11′ and 12′ in forming rollers 11, 12 are of a depth less than the height of the sections to be cut from the first bar 4, only a partial cutting of the large bar 4 is accomplished. With reference to FIG. 8, both cylinders have outer diameters D which are equal. The cylinders are rotated in the opposite direction so that the first bar 4 will be carried through the rollers by the friction generated therebetween. In addition, smaller diameters d of the cylinder, where the groove is provided on the cylinder (11′, 12′), are equal in each roller 11, 12. The circumferential grooves 11′ and 12′ are the same width as the second bars that will be cut (51, 52, 53) but are less deep than the bars so that the second bars 51, 52, 53 will not be separated until passing through the second complex 2B. As can be seen in FIG. 8, the grooves 11′, 12′ of each roller 11, 12 are aligned with a non-grooved portion of the opposite roller so that the shearing edges marked in FIG. 8 as 11″ and 12″ become the complementary shearing edges when the first bar 4 passes therebetween.

FIG. 5 shows the first bar 4 coming out of a continuous casting or blooming mill 6 (FIG. 4) and being transported by roll-feeding- line 31 to the shearing rollers 11, 12. First bar 4 is stressed by splines or grooves 11′ 12′ of rollers 11, 12 as shown in FIG. 5 to cause first bar 4 to flow into smaller sectioned displaced portions or second bars 51, 521 53 at edges A, C and B, D by shearing edges 11″ and 12″ (FIG. 8). Second bars 51, 52 and 53 are advanced, by the rotation of rollers 11, 12, into the second mechanical complex of shears 21, 22, 23 (FIG. 5).

These partially cut or severed bars 51, 52, 53 are forced apart principally by tool 21 (center tool) wedging against the face of the center bar 52 to force bar 52 further out of alignment with side bars 51, 53 as can be seen in FIGS. 2, 5, 9. This completes the severing of the bars 51, 52, 53 into individual pieces.

More specifically, as best seen in FIG. 5, lower tool 21 is sized and disposed so as to coincide with the surfaces A, E and B which surfaces are formed by deforming bar 4. Further advance of bar 4 into the second mechanical complex 2B causes the bar 4 to be completely severed at 21′, 21′ (FIG. 5, FIG. 9) into seperate smaller sectioned bars 51, 52, 53 across an expansion means such as the wedge shaped tools 21, shown in FIGS. 1 and 5. The following table is a key to major elements shown in the drawings and is presented herein as an aid to understanding the discussion thereof.

| TABLE OF ELEMENTS | |
|---|---|
| 1 | shearing cylinders (also 11, 12) |
| 2 | shear |
| 2A | first mechanical complex |
| 2B | second mechanical complex |
| 4 | bar which is to be cut |
| 11 | lower shearing cylinder or roll |
| 12 | upper shearing cylinder or roll |
| 11′ | groove on lower shearing cylinder |
| 12′ | groove on upper shearing cylinder |
| 12″ | full part on the sides of the grooves on upper shearing cylinder |
| 21 | tool having the functions of: |
| 21′ | bottom stripper guide - to support and push or wedge (primary function) |
| 21″ | scraping and chamfering part (secondary function) |
| 21′g | descending section of the upper surface bottom stripper guide |
| 21′a | ascending section of the upper surface bottom stripper guide - upward push or wedge |
| 21′z | lateral section for push or wedge to the left |
| 21′d | lateral section for push or wedge to the |

TABLE OF ELEMENTS -continued

| | |
|---|---|
| | right |
| 21"r | left and right scraping sections |
| 21t | bottom stripper guide - push or wedge to the right, to the left and scraping |
| 22 | lower tool with supporting function - bottom stripper guide |
| 22b | similar to tool 22, with upward push function and bottom stripper guide |
| 23 | upper tool having the function of top stripper guide and support |
| 31 | run-in table |
| 32 | run-out table |
| 71 | shear for the transversal cutting of the bars |
| 72 | cooling bed for the bars |
| Ii | tool 22 |
| I'i | tool 22b |
| Is | tool 23 |
| IVi | lower tool 21 with functions of 21'g, 21'a, 21'z, 21'd |
| IVs | upper tool 21t with functions of 21'z and 21'd |
| H | horizontal roll stand |
| S | spindles and couplings |
| P | pinion stand |
| R | reduction gear |
| C | connection to main gear drive |
| N | "necks" of shearing cylinders |
| M | "spatulas" of shearing cylinders |
| d | diameter of the grooves of shearing cylinders |
| T' | support crosspiece for lower tools |
| T" | support crosspiece for upper tools |
| F | tension rod of upper tool |

Referring now to FIG. 6 the shown schemas which shows schematically each kind of necessary tool, in the second mechanical complex which is necessary to perform each number of longitudinal shearings on the bar of larger section. Each kind of tool has determined functions. As shown, they are all in the lower position, but when inverted, they can be mounted in the upper position. All of the kinds of tools have the stripper guide and support functions and support functions. The tools 22 and 23 of FIG. 1, FIG. 2, and FIG. 3 and FIG. 5 correspond to that shown schematically at I in FIG. 6. The kinds of tools shown schematically at II, III and IV also respectively have: a push-on wedge function to the left bar, a push-on function to the right bar, and a simultaneous push or wedge to the left and right bar (wedging function). The kinds of tools schematically shown in V, VI and VII respectively have the functions: to scrape the shearing between the center bar and the left bar, to scrape the shearing between the center and the right bar, and to scrape simulataneously the shearing between the center bar, the left bar and the right bar. The kinds of tools schematically shown in VIII, IX, and X also have respectively the functions: to chamfer the upper adjacent edge to the left bar, to chamfer the upper adjacent edge to the right bar, and to chamfer simultaneously the upper adjacent edges to the left bar and right bar. After all, the kind of tool schematized X sums up or includes all the foreseen functions and little by little performed by every one of the other tools, as previously specified. The tool 21 of FIG. 1, FIG. 2, FIG. 3 and FIG. 5, which is drawn on a smaller scale, corresponds to the schematic showing of X of FIG. 6.

The tool 21 (FIG. 10A, 10B) performs all the functions noted above, as follows: The upper surface of the tool is formed, in the direction of its length as regard to the intermediate horizontal shearing plane FIG. 1 (passline), starting from the side of the shearing rolls 11,12, of a first ascendent portion and of a second descendent longer portion. The first portion acts as stripper guide, the second portion acts as support of the side E of the intermediate bar 52 of FIG. 5. In FIG. 3, starting from the side of shearing roll 11, on tool 21 is distinguished the portion 21' in which the constant width starts extending until it becomes another time constant in correspondence of the anterior parts of the blades marked 21". This expansion on the horizontal plane of the tool, whose sides are always shown with 21" in FIG. 1 and FIG. 5, contemporaneously causes the perpendicular forcing to the interior faces A and B of the portions of bar 51 and 53 of FIG. 5, or the push on wedge on the left and the push on wedge on the right (wedging). Finally, the scraping and the chamfering on the left and on the right are performed respectively by the anterior and the posterior parts of the blades 21" of FIG. 1, FIG. 2, FIG. 3 and FIG. 5. These blades 21" are elevated as regard to the upper surface of the tool 21 an amount slightly greater than the portion C and D of FIG. 5; the interior faces are far from them of an amount, equal to the width of the bar 52 and the thickness of each one is equal to the distance between the bar 52 and the bar 51 or between the bar 52 and the bar 53. The posterior blades 21" provide chamfering of the upper edges of the bar 51 and 53 adjacent to the bar 52 of FIG. 5. Finally, the blades 21" can be in a single piece with the tool 21 or mechanically supported or connected to it.

In accordance with the present invention and with particular reference to FIG. 5, the large rectangular bar 4, transported by the run-in table 31, enters first mechanical complex 2A, it is gripped by the shearing rolls 11 and 12 in correspondence with grooves 11' and 12' which include the shearing edges or the circular shear blades, it is continuously pushed forward and is progressively and simultaneously cut longitudinally in the portions of thickness marked A and B and in the opposite portions of A and B, and its center part is pushed upwards and its adjacent parts downwards until they touch the least diameter of the grooves. The rectangular bar 4 thus partially cut in the smaller portions 51, 52 and 53, not severed one from the other with reference to the portions C and D, leave the shearing rolls 11 and 12 of the first complex, and are acted upon by the tools 21, 22 and 23 of the second complex. Driving the bars against tools 21, 22, 23, and mainly the tool 21 produces a wedging action on the faces marked A and B. The tool 21 generates wedging which is equal and reverse on the faces marked A and B, when the anterior parts of said faces A and B, advancing, meet the anterior parts of the faces of the wedging portion 21". The above mentioned forcing also acts in an horizontal plane that is perpindicular to the faces marked A and B, performs the separation of the portions C and D so that the bars 51, 52 and 53, still pushed by the shearing rolls, can go on lightly spaced one from the other of an equal quantity to the thickness of the vertical blades 21". In addition, the blades 21" scrape the cut faces of the cut, severed and spaced bars 51, 52 and 53 and chamfer the upper edges of the bars 51, 52 and 53 adjacent to the bar 52. Advancing the bars 51, 52 and 53 go onto run-out table 32 and are pushed forwards to the area of transverse shearing and of cooling.

Thus, at the second complex at 21", 21" (FIGS. 1–3, 5 and 9), the separated and advancing bars 51, 52, 53 are scraped and chamfered into trimmed form. With reference to FIG. 4, still further advance of bars 51, 52, 53 moves them to outlet line 32. Usual cutting devices may be used to cut the second bars to size as required. The bars are then normally allowed to cool, such as at a usual cooling station (in FIG. 11).

Detailed structure of tools 21, 22 and 23 is shown in FIGS. 1, 2, 3, 5, 9 and 10A, 10B. The different functions of tools 21, 22, 23 are schematically shown in FIG. 6. In FIG. 6, I (tools 22, 23) and X (tool 21), show the functions respectively performed, in turn, by tools II to IX as discussed in detail above.

In summary, the tools 21, 22, 23 form, as discussed above, the second mechanical shearing (detaching) assembly 2B according to the present invention. It can be said that the main function, at this complex, is performed by tool 21 which is placed downwardly between tools 22. Tool 21 operates to detach the central bar 52 from bars 51 and 53 (as illustrated in FIG. 9). In fact, as can be seen in the left part of FIG. 9 and FIG. 5 the action of the Rollers 11, 12 has completely detached central bar 52 from lateral bars 51 and 53 along a height which can be indicated as being two thirds the total height of the bars, i.e. equal sections A-B-A'-B' (4$a$ versus 4$b$ in FIG. 1). Thus, tool 21, in cooperation with adjacent tools 22 and with upper tool as shown on the right side of FIG. 9, completely detaches the bar as will be described in detail hereinafter.

Figures 10A, 10B, 11A, 11B, 11C, 12, 13, 14, 15, 16, 17, 18, 19:
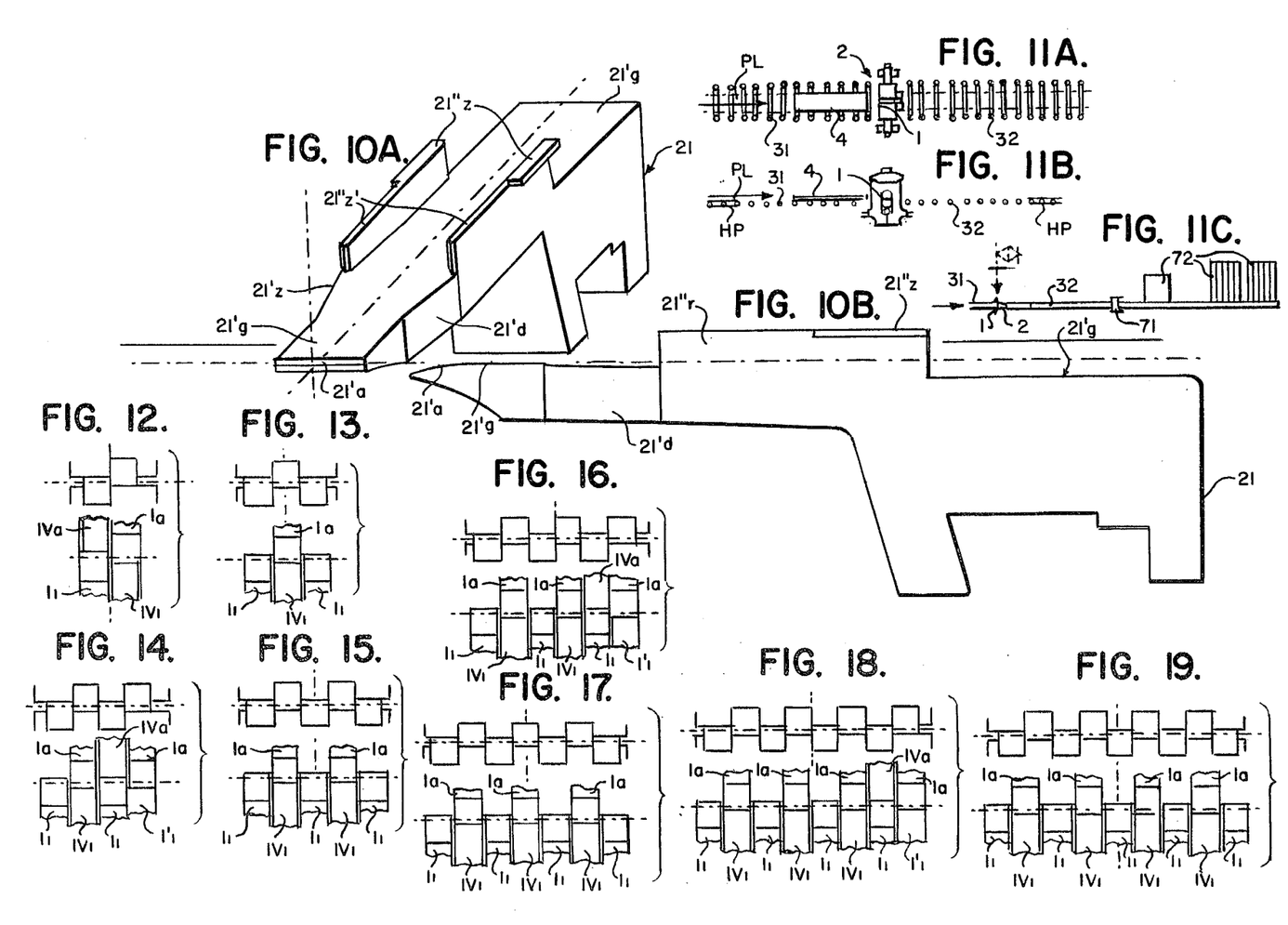

FIG. 10A, 10B show two lateral wings 21"r, shaped as two scraping elements (to the left and/or to the right) in the front part thereof, and as chamfering elements 21"z (to the left and/or to the right) in the back part thereof. (See also FIG. 5). These functions of front and back parts 21"r and 21"z, as well as the primary functions of pushing or wedging to the left and/or to the right, which all can be performed by tool 21 and, excluding only the chamfering (to the right and/or to the left) performed by tool 21t, are schematically shown in FIG. 6.

Referring to FIGS. 13 to 19, some embodiments have been shown relative to the number of the cut bars, from three to nine, with a particular reference to the upper and/or lower position of tools 21, 21t, 22, 22b and 23.

In these Embodiments:

IVi shows tool 21 which is disposed as a lower tool push or wedge upwardly, to the right and to the left, as shown on FIG. 6;

IVs shows tool 21t primarily pushing or wedging the bars to the right and to the left, and being disposed as an upper tool, as shown by IV in FIG. 6;

Ii shows tool 22 disposed as a lower tool, as shown by I in FIG. 6;

I'i shows tool 22b disposed as a lower tool as shown by I in FIG. 6;

Is shows tool 23 disposed an an upper tool as shown by I in FIG. 6;

In FIGS. 12 to 19 two parts should be noted.

Above is shown the grooves of the coacting shearing upper and lower cylinders with respect to the "pass-line".

Below is shown the positon of the upper and lower tools, always with respect to the "pass-line". The single tools are indicated as noted in the above references.

The structures and the functioning of run-out table 32 and run-in table 31 are already well known from the conventional rolling mills. Similarly, vertical shears 71 are known for the transversal hot shearing of the bars, as well as cooling stations 72.

In FIG. 11A, 11B, 11C are structures which are schematically shown in FIG. 4, with reference numbers 31, 32 and 7. On the left part thereof, run-in and run-out tables 31 and 32 are shown in a plan and lateral view, while in the right part thereof the same are shown only in a plan view, relating to shear 71 and to cooling beds 72. These are well-known features normally employed in the art, and therefor are indicated as an aid in understanding the present invention device and its intended use.

For a better understanding of the operation of tool 21, the tool 21 may be characterized—more specifically—as a tool providing a push to the right, to the left, as well as an upward push. Tool 21 is supported at one end thereof by crosspiece T' (FIG. 1), which is part of the horizontal roll stand as used in the well known rolling mills, while the other end thereof is shaped to conform with full part 11", disposed within the two circumferential grooves 11' of cylinder 11, and to rest on part 11" (FIG. 8).

The upper surface of tool 21 (see especially FIGS. 10A, 10B) includes two sections 21'a and 21'g. Front section 21'a, i.e. the section towards shearing cylinders 11 and 12, is slightly inclined from the resting point of the front part thereof on part 11" in the ascendent direction and for a small portion thereof. This provides an upward wedging action or push or Surface E in the detaching stage of second bar 52 from bars 51 and 53.

This small ascendent portion or section is connected to a descendent portion or section 21'g (FIGS. 10A, 10B) on the same tool 21 in order to avoid scharf formation. Immediately behind the point where section 21'g is connected to section 21'a, the tool is shaped, in the width thereof, to form a truncated cone for a section wherein the width thereof is reinforced with respect to the width of section 21'a, as to remain constant up to the end of the tool. Said section in the form of a truncated cone has therefore an expansion wedging function. In fact, section 21'd (FIGS. 10A, 10B) "pushes" or wedges bar 51 to the right against face A thereof, while section 21's pushes bar 53 to the left against face B thereof. Furthermore, the truncated cone expands the upper surface of tool 21 in such a way as to allow bar 52 to pass between the two wings of scraping tool 21"r, which will be described in detail hereinbelow.

Bar 52 will therefore be detached from bars 51 and 53, and continue its way guided along section 21g of tool 21, until it goes back onto the same plane of bars 52 and 53, and thereafter onto the same plane of run-out table 32 (FIGS. 1, 4, 8, 11A, 11B, 11C).

In order to prevent the bar from lifting off from resting on section 21'g of tool 21, there is provided, above tool 21, and parallel to section 21'g thereof, an upper tool 23 having the function of a top strippers and extending downward push or force. Tool 23 rests in circumferential groove 12' with one end thereof, shaped to fit with circumferential groove 12'. The other end of tool 23 rests on upper crosspiece T" (FIG. 1) of the same roll stand of above mentioned kind, presently known and used in rolling mills. Tool 23 will be kept in this position by a mechanism F (FIG. 1) also known in conventional rolling mills.

Finally, two tools 22—22 are provided, placed at the right and at the left side of tool 21, with the function of bottom stripper guides, to guide the movement of separated bars 51 and 53. Right and left tools 22 are resting, with one of the ends thereof, on the right and left end of crosspiece T'. The other ends of right and left tools 22, are shaped to fit with respective grooves 11', and rest within said grooves on both sides of tool 21. Right tools 22 and left tools 22 are generally disposed lower than tool 21, although basically on the same plane thereof, and higher than run-in table 31 and run-out table 32 which are normally in coincident planes. Thus, tools 22 assure, similarly to run-out guides of the conventional rolling mills, that the cut bars are guided along run-out table 32 in the longitudinal direction of advancement thereof.

According to the present invention the number of the shearings, i.e. the number of the bars which may be obtained by shearing one first bar 4, may be more than two, and as shown herein, as a preferred embodiment, there are three.

The total number of the cut bars are equal to the sum of the grooves carried on the two shearing cylinders 11 and 12.

If there are an odd number and more than three of the bars to be cut, tools 21, 22 and 23 still keep their lower or upper positions (as well as they will keep the functions thereof) as described and illustrated hereinbefore. Obviously, the number thereof will increase in a proportion to the number of the bars to be cut (FIGS. 13, 15, 17, 19). Various modification as would be generally obvious, may be required as follows.

In the case of an equal number of cut bars, and more than two, it will be necessary to make use of further two tools being very similar to tools 21 and 22, the positioning thereof requiring a slightly different form (FIGS. 12, 14, 16, 18).

Still according to the present invention, in order to detach the fourth bar, a tool 21t (IVs) is placed within the second and the fourth bar, but in an upper position. Tool 21t, thus positioned, will detach the fourth bar from the third one, pushing onto the second bar. Said tool 21t is different from tool 21 (IVi) above described, for the only reason that surface portions 21'a and 21'g are in the same plane and are placed in a parallel position with respect to the upper surface of the lower tools 22 (Ii). Consequently, tool 21t will keep the shape thereof in the form of a truncated cone in the width thereof in order to push towards the outside of the fourth bar.

The fourth bar, in the advancement thereof toward run-out table 32, needs a rest or guide and the surface thereof must be placed at the same level as the surface of tool 21. For this purpose a tool 22b (I'i) is provided as a resting plane, being of the same height as one of tools 21 (IVi) in section 21'g and secured to crosspiece T'.

It is useful to repeat that tools 22 and 23 perform always the same functions and are always in the same respectively positions.

Tool 21t, even being always upperly placed as an upper tool, can perform only the secondary scraping function.

Tool 22b will always be lowerly placed, as a lower tool hooked to crosspiece T', and will always perform only the function of upward push and bottom stripper guide.

According to the present invention, the secondary functions of chamfering and scraping are performed both by tools 21, while tool 21t has the only scraping function.

Of course, the two coacting mechanical complexes are sufficiently cooled during the operation and are also cleaned from eventual shavings or slags by means of a system already well known.

Of course, the guides placed at the two sides of the run-in table, longitudinally, as to center the inlet of the bar towards the shearing area, as well as the lateral similar guides, as to keep the cut bars in the direction of the runout table of the shearing apparatus, have shapes and features already well known.

As is clear from the above discussion, many modifications are possible within the scope of the present invention. These are set forth hereinabove as illustrative of presently preferred embodiments and not intended to be limiting. The scope of the invention is intended to be only as defined by the claims as follows:

What is claimed is:

1. A shear for two stage continuous shearing of a hot metallic first bar into smaller cross-sectional sized second bars, having a predetermined thickness, width and height, as the first bar comes out of a continuous casting mill in a steel plant or out of a blooming or rolling mill, said shear comprising in combination:

a first mechanical complex operable to cut the first bar about ⅔ through the thickness thereof and to deform the uncut thickness of the hot metallic first bar continuously into a predetermined sized and number of displaced sections; and a second mechanical complex operable to sever the displaced sections into separated smaller bars;

said first mechanical complex comprising:

first and second shearing rolls, means for separating said first and said second rolls for disposing them apart about one-third the thickness of said first bar and means for rotatably driving said first and said second rolls in counter directions to roll therebetween hot metallic bars, said first and said second rolls each having grooves formed therein, and non-grooved portions, the grooves on said first roll being displaced with respect to the grooves on said second roll so that non-grooved portions of each said roll are aligned with grooved portions of the other said rolls, the total number of grooves being equal to the total number of second bars to be formed;

each said groove having a width equal to the predetermined width of the second bars and a depth of about one-third the thickness of the second bars, said rolls coacting to deform the hot first bar being rolled between said rolls, said rolls permanently deforming the rolled hot bar into displaced sections corresponding in size to the second bars;

said second mechanical complex comprising lower tools and upper tools anchored with respect to each other and to said first mechanical complex, said upper and said lower tools having forward portions aligned with respect to displaced surfaces of the deformed sections of said first bar as it passes through said first mechanical complex, to guide the displaced surfaces over said upper and lower tools;

said upper and said lower tools operating conjointly to support and to guide the displaced sections apart from each other; and, means on said upper and said lower tools for severing the deformed first bar into separate, smaller sectioned bars.

2. A shear according to claim 1, wherein
said upper and said lower tools are disposed in operable alignment with said grooved and non-grooved portion of said rolls,
said upper tools being inclined upwardly from their forward portions, and said lower tools being inclined downwardly from their forward position.

3. A shear according to claim 1 or 2, wherein said upper and said lower tools have a respective wedge structure near their respective forward portions to force the deformed first bar passing thereover to split into the second bars.

4. A shear according to claim 1 or 2, wherein at least one of said upper and said lower tools comprise means to scrape and to chamfer the sharp edges of the bars passing thereover.

5. A shear according to claim 1 or 2, wherein said two mechanical complexes are hooked and anchored to a single carrying structure and including means for a quick and easy assembling of said rollers and of said tools.

6. A shear according to claim 1 or 2, wherein said shear is located downstream of the continuous casting mill or downstream of the blooming mill.

7. A shear for a continuous operative two-stage shearing of a hot metallic first bar into smaller cross-sectional sized second bars, having a predetermined thickness, width and height, as the first bar comes out of an apparatus for the continuous casting of steel in a steel plant or out of a blooming or rolling mill, said shear comprising in combination:
   a first mechanical complex for forming a cut approximately $\frac{2}{3}$ through the thickness of the hot metallic bar and for deforming the uncut portion of the thickness of the hot metallic bar continuously into a predetermined number and sized displaced sections; and
   a second mechanical complex for severing the displaced sections into separated smaller bars;
   said first mechanical complex comprising:
   first and second horizontal shearing rolls, means for operably adjusting and separating said first and said second horizontal shearing rolls for adjustably separating them from each other about $\frac{1}{3}$ the thickness of the hot metallic bar and means for operably adjusting and rotably driving said first and said second horizontal shearing rolls in counter directions at about the same speed to roll therebetween the hot metallic bars, said first and second rolls each having a groove formed therein displaced with respect to each other, with a width equal to the predetermined width of the second bars, and a depth equal to about $\frac{2}{3}$ the predetermined height of the second bars, said rolls coacting to partially cut and deform the hot metallic bar being rolled between said rolls permanently into displaced sections of predetermined size corresponding to the smaller second bar desired;
   said second mechanical complex being mounted downstream of said first mechanical complex as the hot first bar is rolled therethrough and including separating means anchored and aligned with respect to said first mechanical complex so as to separate the displaced sections into separate second bars;
   said separating means including:
      a wedging tool of substantially the same width as the width of the displaced section, said wedging tool being so disposed as to have its forward portion aligned with an inner surface of a first of the displaced sections whereby said first displaced section is guided against said wedging tool,
      said wedging tool having a rear portion, said rear portion including means for severing said first displaced section from the hot bar; and,
      guide tools to guide and support the first bar for separation thereof into sections.

8. The circular shear of claim 7, wherein
   said second mechanical complex further includes scraping and chamfering means for scraping and chamfering the separated small second bars; and
   said scraping and chamfering means is mounted to said separating means.

* * * * *